United States Patent [19]

Scotcher

[11] 4,170,804
[45] Oct. 16, 1979

[54] WIPER ARM AND MOUNTING HEAD

[75] Inventor: Douglas E. Scotcher, Elwood, Victoria, Australia

[73] Assignee: Vanauto Accessories Proprietary Limited, Port Melbourne, Australia

[21] Appl. No.: 906,165

[22] Filed: May 15, 1978

[51] Int. Cl.² .............................................. B60S 1/34
[52] U.S. Cl. .............................. 15/250.34; 15/250.35; 403/79; 403/157
[58] Field of Search ........................ 15/250.31–250.35, 15/250.42; 403/79, 152, 157

[56] References Cited

U.S. PATENT DOCUMENTS 2,142,054  12/1938  Horton ............................. 15/250.34
2,226,358  12/1940  Sibley ............................... 15/250.35

Primary Examiner—Peter Feldman
Attorney, Agent, or Firm—Pollock, Vande Sande & Priddy

[57] ABSTRACT

An improved wiper arm and connector head arrangement which may be readily assembled without use of special equipment by means of inserting opposed bosses on the head into corresponding open-sided recesses on the arm and then relatively rotating the head and the arm, to a position locating a tongue member on the head into a groove in the arm whereby the bosses can no longer be extracted through the open side of the recesses and therefore the head is attached to the arm.

18 Claims, 5 Drawing Figures

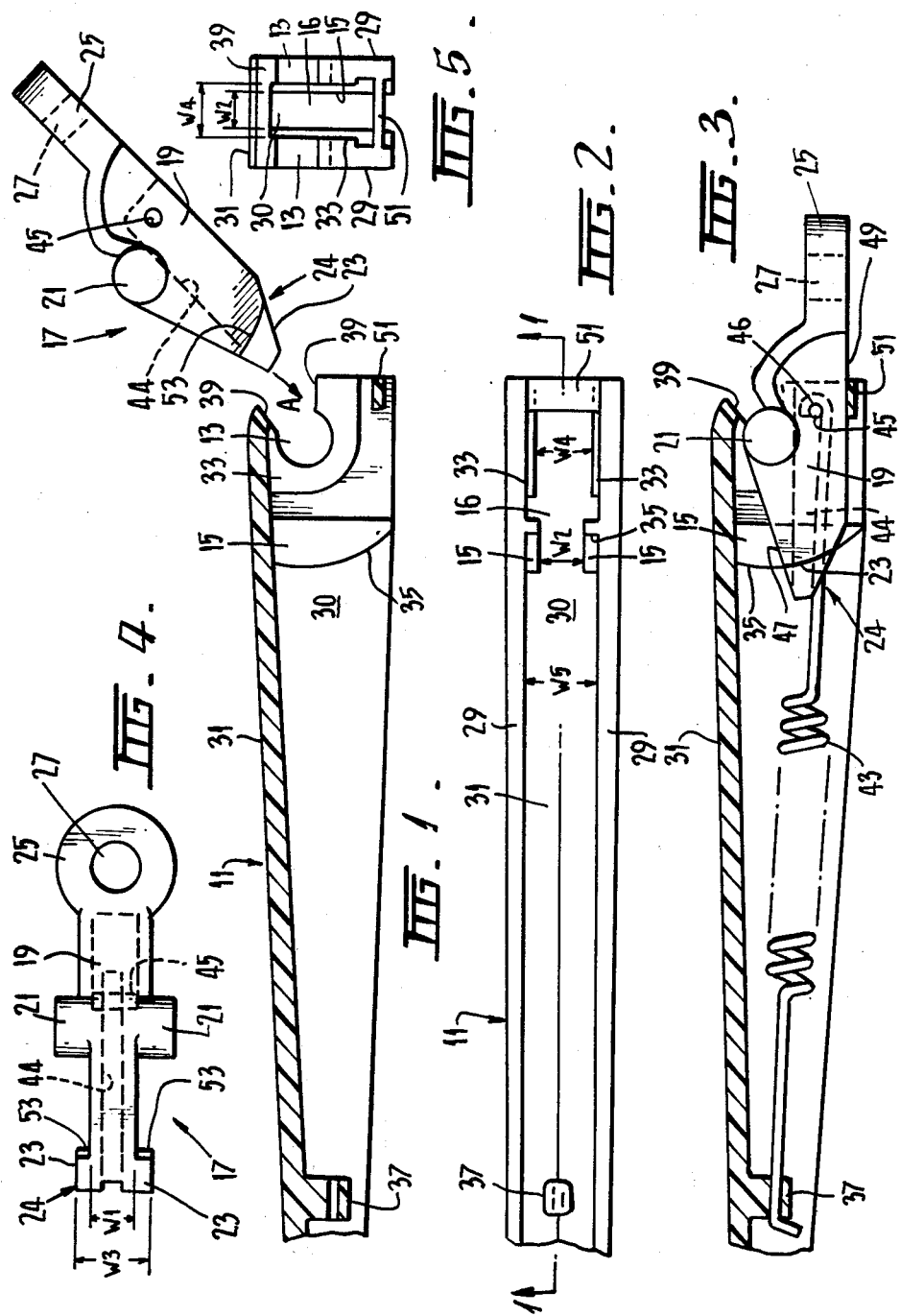

WIPER ARM AND MOUNTING HEAD

BACKGROUND OF THE INVENTION

1. Field of the Invention.

The present invention relates to an improved assembly of a wiper arm and connector head. This assembly is then attachable to a wiper drive stub by means of the connector head.

2. Description of the Prior Art

In the past, wiper arms have been made up of a large number of parts assembled together to form a complete wiper arm. The fabrication of this large number of parts and their subsequent assembly was costly. It would therefore be desirable to fabricate wiper arms in only one complete piece to thereby minimize cost.

In order to be adaptable for use with curved windows, wiper arms are usually not rigidly attached to their drive stubs, since there must be relative movement between the arm and the drive stub in order to allow the arm to follow the curvature of the window. This relative movement is usually enabled by pivotably connecting the head and the arm by means of a pivot pin. However, the provision and assembly of this pivot connection involves additional cost. It is therefore desirable, while still enabling relative movement, to eliminate the use of such pivot pin.

SUMMARY OF THE INVENTION

In one aspect, the present invention provides a wiper head attachable to a wiper arm, the wiper head having a boss and a finger, the wiper arm having a recess with an opening at one side thereof, and a shoulder. The boss is insertable into the recess through the opening whereafter the head is movable relative to the arm, by rotation of said boss in said recess, to a position locating the finger behind the shoulder, thereby preventing removal of the boss from the recess through the opening, effecting the attachment.

In one preferred form of the present invention, the shoulder and the finger form part of a tongue and groove connection wherein the shoulder forms part of one side of a groove and the finger forms part of the corresponding side of a tongue, whereby said relative movement locates the tongue behind the groove, thereby preventing removal of the boss from the recess through the opening and effecting the attachment.

Additionally, in this preferred form, there are bosses, one located on each side of the head, and two recesses, one located on each side of the arm. Each recess has an opening, whereby, on corresponding sides of the arm and head, each boss is insertable into the corresponding recess through the opening of that corresponding recess.

BRIEF DESCRIPTION OF THE DRAWINGS

FIG. 1 is a side sectional view of a wiper arm taken along line 1—1 in FIG. 2, together with a side elevational view of a wiper head positioned ready for attachment to said arm;

FIG. 2 is an underneath plan view of the arm shown in FIG. 1;

FIG. 3 is a side view similar to FIG. 2, showing the head attached to the wiper arm;

FIG. 4 is a plan view of the head; and

FIG. 5 is an end elevational view of the arm.

In the above drawings it should be noted that only the end of a wiper arm 11 which is attachable to a wiper head 17 is shown.

DESCRIPTION OF THE PREFERRED EMBODIMENT

Referring to FIG. 1, wiper arm 11 is provided with a pair of recesses 13 and a pair of shoulders 15. Each recess 13 has a side opening defining jaws 39 at either side thereof. In FIG. 1, a wiper head 17 is shown positioned ready for attachment to arm 11.

Referring now to both FIGS. 1 and 4, mounting head 17 comprises a body 19 having an approximately centrally located boss 21 located on each side thereof. At one end of the body 19 there are a pair of fingers 23 one located on each side of body 19. The pair of fingers 23 together form a tongue 24. An eye 25 having an opening 27 is located at the other end of body 19. Opening 25 is adapted (not shown) to engage a wiper drive stub (not shown) for a wiper assembly.

A slot 44 is centrally located between bosses 21 and extends from tongue 24 between fingers 23 to a location just past bosses 21. A pair of holes 45 pass through head 17 at this location and communicate with slot 44. Holes 45 are adapted to receive a pin 46 extending through slot 44.

Referring now to both FIGS. 2 and 5, arm 11 has a "U" shaped configuration consisting of side members 29 and intermediate member 31, thereby defining a passage 30 within the arm 11. Referring to FIG. 2, side members 29 are thickened in the region about recess 13 by reinforcing portions 33. A shoulder 15 projects inwardly of each side member 29 to thereby define a groove 16 between opposed shoulders 15. On the faces of shoulder 15 which are remote from recess 13, a curved face 35 is found. The curvature of faces 35 are substantially centered about recess 13. A fixture 37 protrudes from connecting member 31 at a point which is remote from the end of wiper arm 11 which is attachable to the head 17.

The attachment of head 17 to arm 11 will now be described.

Referring to FIG. 1, it can be appreciated that head 17 may be moved in the direction of arrow A to insert tongue 24 through passage 30 between reinforcing portions 33, to insert bosses 21 into corresponding recesses 13. The jaws 39 of each recess 13 must be forced apart slightly to admit boss 21, whereby boss 21 is snap-fitted into recess 13. Despite such snap-fitting, relative movement of head 17 with respect to arm 11 by rotation of each boss 21 in corresponding recess 13 is permitted. After insertion of boss 21 into recess 13, relative rotational movement of head 17 in the clockwise direction (relative to FIGS. 1 and 4), substantially centered about boss 21, enables upward movement of tongue 24 into passage 30 and behind groove 16 to locate each finger 23 behind corresponding shoulder 15, to thereby prevent removal of bosses 21 from recesses 13 by movement through the side opening between jaws 39, and to thereby effect attachment of head 17 to arm 11.

The faces 53 of fingers 23 which are closest to boss 21 are curved and have their center of curvature located about bosses 21. Thus faces 53 of fingers 23 and faces 35 of shoulders 15 closely abut each other while permitting the above mentioned relative rotational movement.

Referring now to FIG. 3, a spring 43 is connected between arm fixture 37 and pin 46 to thereby bias arm 11 and head 17 into an attached position with fingers 23 located behind shoulders 15.

As shown in FIG. 3, a removable tab 51 which bridges side members 29 of arm 11 prevents spring 43 from biasing face 47 of head 11 into abutment with intermediate member 31 of arm 11. Instead, face 49 of head 11 abuts tab 51 and thereby maintains head 17 and arm 11 in the relative position desired by car manufacturers to enable easy placement of opening 27 over a windscreen wiper drive stub (not shown). After such a placement tab 51 is removed, for example by sufficient force to break the tab 51 away from arm 11, and thereby enable spring 43 to bias arm 11 towards the windscreen. According to the embodiments shown, and referring to FIGS. 2, 4 and 5, the attachment of head 17 to arm 11 is clearly dependent upon the following dimensional relationships being observed:

$$W_1 < W_2 < W_3 < W_4 < W_5.$$

The above described preferred embodiment results in a number of advantages.

The arm and head may be easily assembled together without the need for special equipment or the need for provision of pivot pins or the like.

The arm structure hereinbefore described may be molded in a plastic material, thereby greatly reducing the cost of arm fabrication and eliminating the cost of arm assembly. An indication of the extent to which costs may be reduced is gained from the fact that prior art arm-head assemblies consisted of from 15 to 20 separate parts, while the entire above described assembly consists of only 4 separate parts, i.e., arm 11, head 17, spring 43 and pin 46.

Additionally, the provision of a removable tab on the arm enables assembly of the arm and head in a position relative to each other, whereby the so positioned assembly may readily be fitted to an automobile.

We claim:

1. A wiper head attachable to a wiper arm,
said wiper head having a boss and a finger,
said wiper arm having a recess with an opening at one side thereof, and a shoulder;
whereby said boss is insertable into said recess through said opening, whereafter said head is movable relative to said arm, by rotation of said boss in said recess, to a position locating said finger behind said shoulder,
thereby preventing removal of said boss from said recess through said opening and thereby effecting said attachment.

2. A wiper head as claimed in claim 1, wherein said boss is snap-fittable through said opening into said recess.

3. A wiper head as claimed in claim 1 or 2, wherein a spring is interconnected between said arm and said head to thereby resiliently hold said head and said arm in a position locating said finger behind said shoulder.

4. A wiper head as claimed in claim 3, wherein a removable tab is provided on said arm, thereby enabling said spring to hold said head against said tab in a position locating said finger behind said shoulder and relatively locating said arm and head in a desired position.

5. A wiper head as claimed in any one of claims 1, 2 and 4, wherein said shoulder and said finger form part of a tongue and groove connection wherein
said shoulder forms part of one side of a groove and said finger forms part of the corresponding side of a tongue,
whereby said relative movement locates said tongue behind said groove, thereby preventing removal of said boss from said recess through said opening and thereby effecting said attachment.

6. A wiper head as claimed in any one of claims 1, 2 and 4, wherein
there are a pair of bosses, one boss located on each side of said head, and
there are a pair of recesses, one recess located on each side of said arm, each recess having an opening, whereby, on corresponding sides of said arm and head, each boss is insertable into the corresponding recess through the opening of that corresponding recess.

7. A wiper arm attachable to a wiper head,
said wiper head having a boss and a finger,
said wiper arm having a recess with an opening at one side thereof, and a shoulder;
whereby said boss is insertable into said recess through said opening whereafter said head is movable relative to said arm, by rotation of said boss in said recess, to a position locating said finger behind said shoulder,
thereby preventing removal of said boss from said recess through said opening and thereby effecting said attachment.

8. A wiper arm as claimed in claim 7, wherein said boss is snap-fittable through said opening into said recess.

9. A wiper arm as claimed in claim 7 or 8, wherein a spring is interconnected between said arm and said head to thereby resiliently hold said head and said arm in a position locating said finger behind said shoulder.

10. A wiper arm as claimed in claim 9, wherein a removable tab is provided on said arm thereby enabling said spring to hold said head against said tab in a position locating said finger behind said shoulder and relatively locating said arm and head in a desired position.

11. A wiper arm as claimed in any one of claims 7, 8 and 10, wherein said shoulder and said finger form part of a tongue and groove connection wherein
said shoulder forms part of one side of a groove and said finger forms part of the corresponding side of a tongue,
whereby said relative movement locates said tongue behind said groove thereby preventing removal of said boss from said recess through said opening and thereby effecting said attachment.

12. A wiper arm as claimed in any one of claims 7, 8 and 10, wherein
there are a pair of bosses, one boss located on each side of said head, and
there are a pair of recesses, one recess located on each side of said arm, each recess having an opening, whereby, on corresponding sides of said arm and head, each boss is insertable into the corresponding recess through the opening of that corresponding recess.

13. An assembly of a wiper arm and a wiper head,
said wiper head having a boss and a finger,
said wiper arm having a recess with an opening at one side thereof, and a shoulder;
whereby said boss is inserted into said recess through said opening whereafter said head is moved relative to said arm, by rotation of said boss in said recess, to a position locating said finger behind said shoulder, thereby preventing removal of said boss from said recess through said opening and thereby effecting said attachment.

14. An assembly as claimed in claim 13, wherein said boss is snap-fittable through said opening into said recess.

15. An assembly as claimed in claim 13 or 14, wherein a spring is interconnected between said arm and said head to thereby resiliently hold said head and said arm in a position locating said finger behind said shoulder.

16. An assembly as claimed in claim 15, wherein a removable tab is provided on said arm, thereby enabling said spring to hold said head against said tab in a position locating said finger behind said shoulder and relatively locating said arm and head in a desired position.

17. An assembly as claimed in claim 13 or 14, wherein said shoulder and said finger form part of a tongue and groove connection wherein
   said shoulder forms part of one side of a groove and
   said finger forms part of the corresponding side of a tongue,
   whereby said relative movement locates said tongue behind said groove thereby preventing removal of said boss from said recess through said opening and thereby effecting said attachment.

18. An assembly as claimed in claim 13 or 14, wherein there are a pair of bosses, one boss located on each side of said head, and
   there are a pair of recesses, one recess located on each side of said arm, each recess having an opening, whereby, on corresponding sides of said arm and head, each boss is insertable into the corresponding recess through the opening of that corresponding recess.

* * * * *